(12) United States Patent
Oami

(10) Patent No.: US 7,344,293 B2
(45) Date of Patent: Mar. 18, 2008

(54) PLANAR LIGHT SOURCE DEVICE AND LIQUID CRYSTAL DISPLAY DEVICE

(75) Inventor: Yukio Oami, Himeji (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 204 days.

(21) Appl. No.: 11/195,830

(22) Filed: Aug. 3, 2005

(65) Prior Publication Data

US 2006/0044835 A1    Mar. 2, 2006

(30) Foreign Application Priority Data

Aug. 25, 2004   (JP)   ............... 2004-245212

(51) Int. Cl.
*F21V 7/04* (2006.01)
(52) U.S. Cl. .............. 362/624; 362/614; 362/633
(58) Field of Classification Search .......... 362/624, 362/632, 633, 626, 627, 628, 614, 97, 29, 362/30
See application file for complete search history.

(56) References Cited

U.S. PATENT DOCUMENTS

| | | | | |
|---|---|---|---|---|
| 6,490,015 B1* | 12/2002 | Kim | ....................... | 349/58 |
| 6,552,761 B1* | 4/2003 | Seo et al. | ....................... | 349/58 |
| 6,979,102 B2* | 12/2005 | You | ....................... | 362/218 |
| 7,101,055 B2* | 9/2006 | Hsieh et al. | ....................... | 362/29 |
| 2002/0027774 A1* | 3/2002 | Nishiyama et al. | ........... | 362/29 |
| 2006/0209526 A1* | 9/2006 | Miyauchi | ....................... | 362/29 |
| 2006/0215386 A1* | 9/2006 | Hatanaka et al. | ............. | 362/29 |

FOREIGN PATENT DOCUMENTS

JP    2001-4983    1/2001

* cited by examiner

*Primary Examiner*—Alan Cariaso
*Assistant Examiner*—Leah S. Lovell
(74) *Attorney, Agent, or Firm*—Oblon, Spivak, McClelland, Maier & Neustadt, P.C.

(57) ABSTRACT

A planar light source device includes a cold cathode fluorescent tube, a light guide opposed to the light source to emit light which is received from the light source, a frame which supports the light source and the light guide and has a projection which positions the light source and the light guide, and an optical sheet which provides an optical property for light radiated from the light source and has a regulation section that regulates contact between the light guide and the projection of the frame, the regulation section being located between the light guide and the projection.

8 Claims, 3 Drawing Sheets

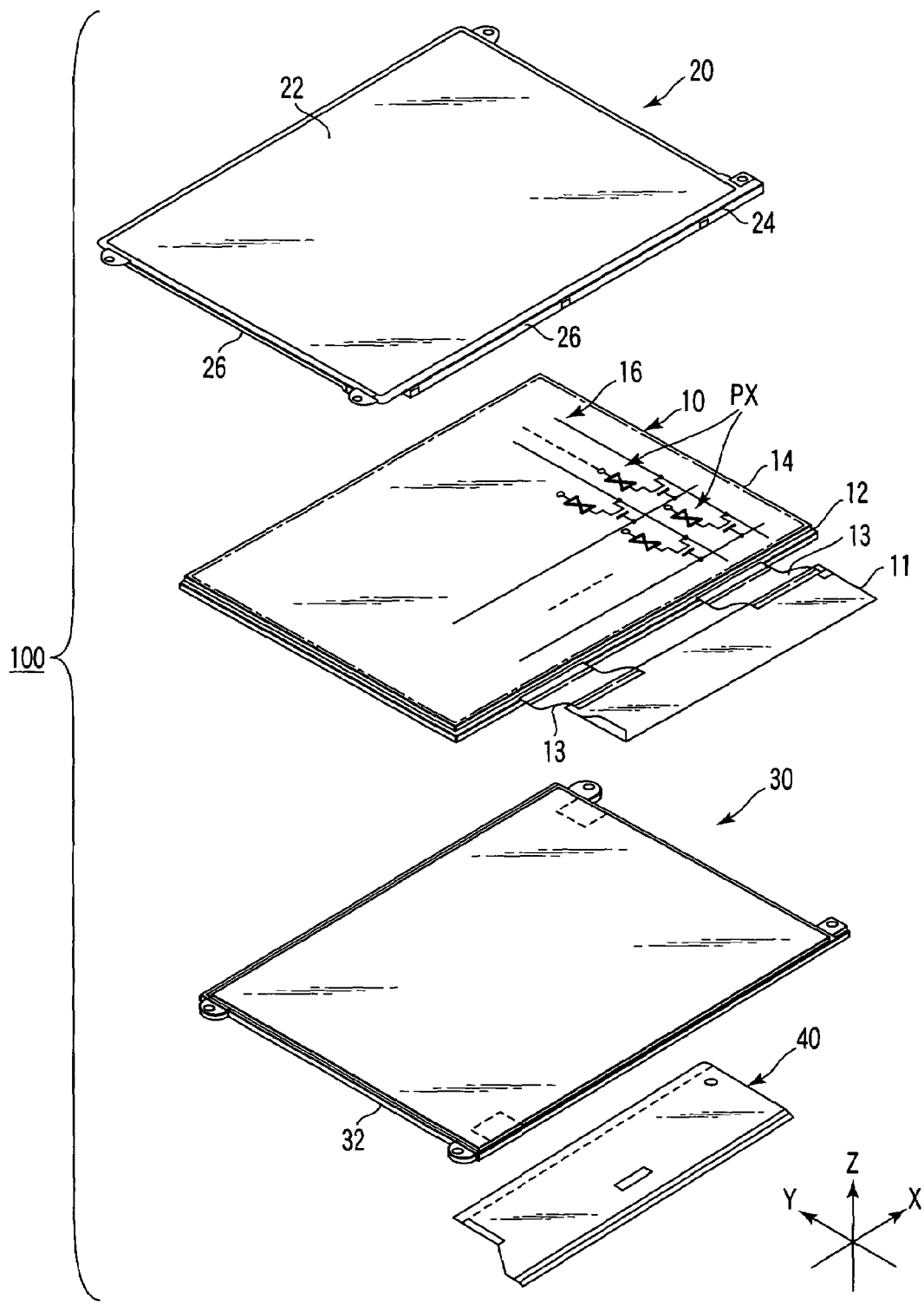
F I G. 1

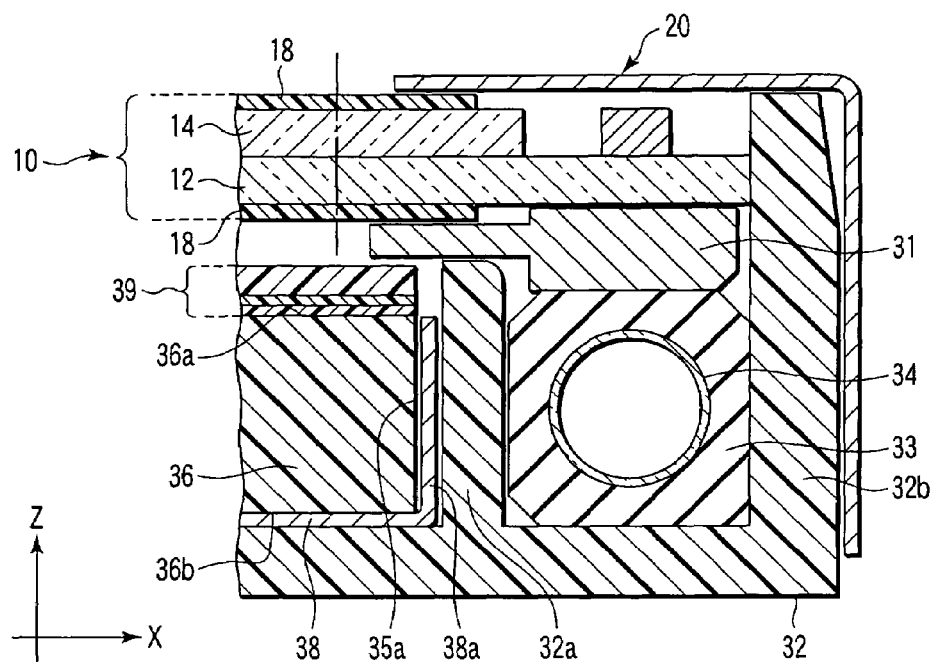
F I G. 3
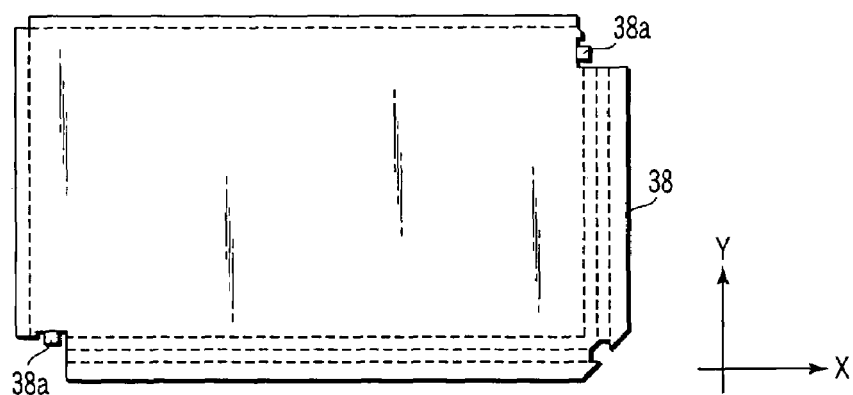
F I G. 4

PLANAR LIGHT SOURCE DEVICE AND LIQUID CRYSTAL DISPLAY DEVICE

CROSS-REFERENCE TO RELATED APPLICATIONS

This application is based upon and claims the benefit of priority from prior Japanese Patent Application No. 2004-245212, filed Aug. 25, 2004, the entire contents of which are incorporated herein by reference.

BACKGROUND OF THE INVENTION

1. Field of the Invention

The present invention relates to a planar light source device that illuminates a liquid crystal display panel, and a liquid crystal display device having the planar light source device.

2. Description of the Related Art

A liquid crystal display device generally includes a liquid crystal display panel that displays an input image and a planar light source device that illuminates the liquid crystal display panel from behind. The liquid crystal display panel is supported by a back frame of the planar light source device and its outer edge is held by a bezel cover with a window section to which an effective display section is exposed.

The planar light source device includes a light source that radiates light and a light guide that receives the light from the light source and emits it toward the liquid crystal display panel. The light guide and the light source are supported by the back frame, and the light source is provided around the light guide. The back frame has a projection that projects between the light source and the light guide. The light source and the light guide are positioned by the projection.

The back frame is formed of, e.g., polycarbonate resin, while the light guide is formed of acrylic resin. Since the back frame and the light guide are formed of such firm materials, the light guide comes into contact with the projection to cause noise when external forces are exerted on the liquid crystal display device to distort the planar light source device.

BRIEF SUMMARY OF THE INVENTION

The present invention has been developed in consideration of the above situation and its object is to provide a planar light source device that suppresses noise caused by contact between a light guide and a projection of a back frame, and a liquid crystal display device having the planar light source device.

According to a first aspect of the present invention, there is provided a planar light source device comprising a light source, a light guide opposed to the light source to emit light which is received from the light source, a frame which supports the light source and the light guide and has a projection which positions the light source and the light guide, and an optical sheet which provides an optical property for light radiated from the light source and has a regulation section that regulates contact between the light guide and the projection of the frame, the regulation section being located between the light guide and the projection.

According to a second aspect of the present invention, there is provided a liquid crystal display device including a liquid crystal display panel having an effective display section in which a plurality of display pixels are arranged and a planar light source device which illuminates the liquid crystal display panel, the planar light source device comprising a light source, a light guide opposed to the light source to emit light which is received from the light source, a frame which supports the light source and the light guide and has a projection which positions the light source and the light guide, and an optical sheet which provides an optical property for light radiated from the light source and has a regulation section that regulates contact between the light guide and the projection of the frame, the regulation section being located between the light guide and the projection.

According to the present invention, a planar light source device that suppresses noise caused by contact between a light guide and a projection of a back frame can be provided, as can be a liquid crystal display device having the planar light source device.

Additional objects and advantages of the invention will be set forth in the description which follows, and in part will be obvious from the description, or may be learned by practice of the invention. The Objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exploded, perspective view schematically showing a configuration of a liquid crystal display device having a planar light source device according to an embodiment of the present invention;

FIG. 3 is a cross-sectional view of the liquid crystal display device shown in FIG. 1, which is taken along line III-III of FIG. 2B; and FIG. 4 is an illustration of an optical sheet of the liquid crystal display device shown in FIG. 1.

DETAILED DESCRIPTION OF THE INVENTION

Figure 2A:
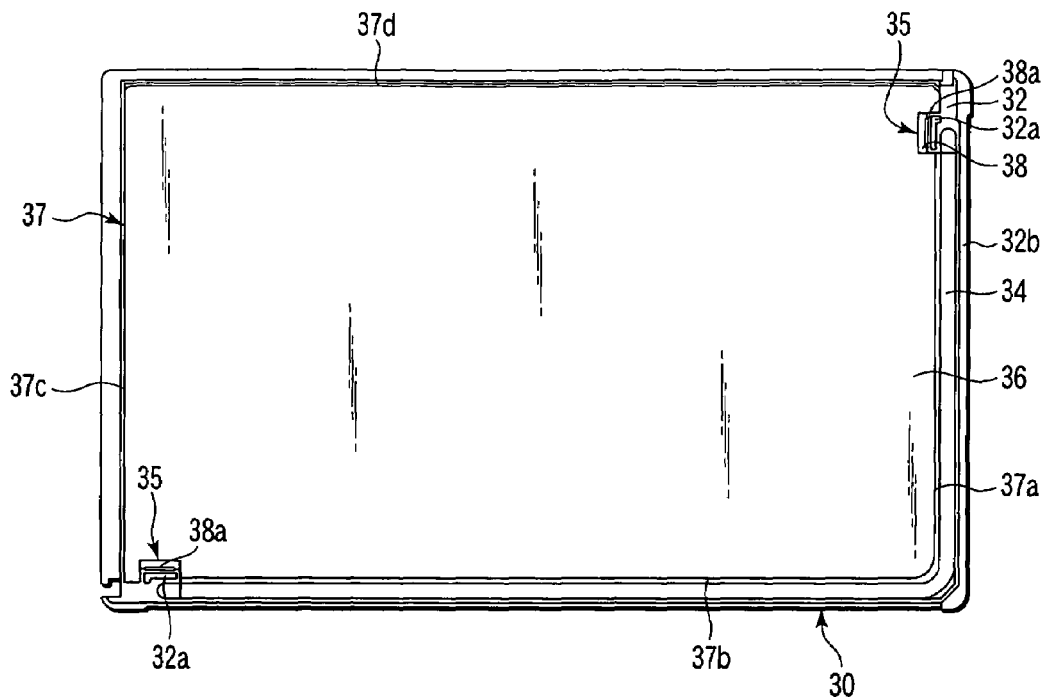
FIG. 2A is a front view of the planar light source device of the liquid crystal display device shown in FIG. 1.

A planar light source device according to an embodiment of the present invention, and a liquid crystal display device having the planar light source device will be described with reference to the accompanying drawings.

Referring to FIG. 1, a liquid crystal display device 100 includes a rectangular liquid crystal display panel 10, a backlight 30 serving as a planar light source device that illuminates the liquid crystal display panel 10 from behind, and a bezel cover 20 that is attached to a back frame 32 of the backlight 30 to hold the outer edge of the device 100. The backlight 30 is provided on the back side of the liquid crystal display panel 10 such that they are opposed to each other. The bezel cover 20 is a rectangular frame and attached to the front side of the panel 10.

Referring to FIGS. 1 and 3, the liquid crystal display panel 10 includes an array substrate 12 and a counter substrate 14, which are opposed to each other. A liquid crystal layer is formed between the array substrate 12 and the counter substrate 14, and a polarization plate 18 is fixed on the outer surface of each of the array substrate 12 and the counter substrate 14. The liquid crystal display panel 10 has a substantially rectangular effective display section 16 corresponding to a display area on which an image is displayed. The effective display section 16 is made up of a plurality of display pixels PX arranged in matrix.

A long, narrow, rectangular, plate-like driver circuit 11 is electrically connected to one end of the liquid crystal display panel 10 through a pair of printed wiring boards 13 to supply a drive signal to the panel 10. The printed wiring boards 13 are each shaped like a flexible, long, narrow, rectangular plate. The driver circuit 11 is provided on the back side of the backlight 30 by bending the boards 13 toward the back side of the backlight 30. A long, narrow, rectangular insulating sheet 40 is formed between the driver circuit 11 and the backlight 30 to secure insulating properties therebetween.

The bezel cover 20 includes a substantially rectangular window section 22 to which the effective display section 16 of the liquid crystal display panel 10 is exposed, and a rectangular, frame-shaped main body 24 that defines the window section 22. The main body 24 has an outer edge section 26 that covers the outer edge of the liquid crystal display panel 10 when the panel 10 is held in the main body 24.

The backlight 30 is substantially rectangular, and its front side is opposed to the back side of the liquid crystal display panel 10 to illuminate the panel 10 from behind. The backlight 30 includes, for example, a substantially L-shaped cold cathode fluorescent tube 34 serving as a light source, a light guide 36 that emits light, which is received from the cold cathode fluorescent tube 34, toward the liquid crystal display panel 10, a back frame 32 that supports the cold cathode fluorescent tube 34 and the light guide 36, and optical sheets 38 and 39 arranged on their respective back and front sides of the light guide 36.

The back frame 32 is also substantially rectangular and has a face that supports the cold cathode fluorescent tube 34 and the light guide 36 and a frame section 32b that faces the sides of the liquid crystal display panel 10 and the cold cathode fluorescent tube 34.

Figure 2B:
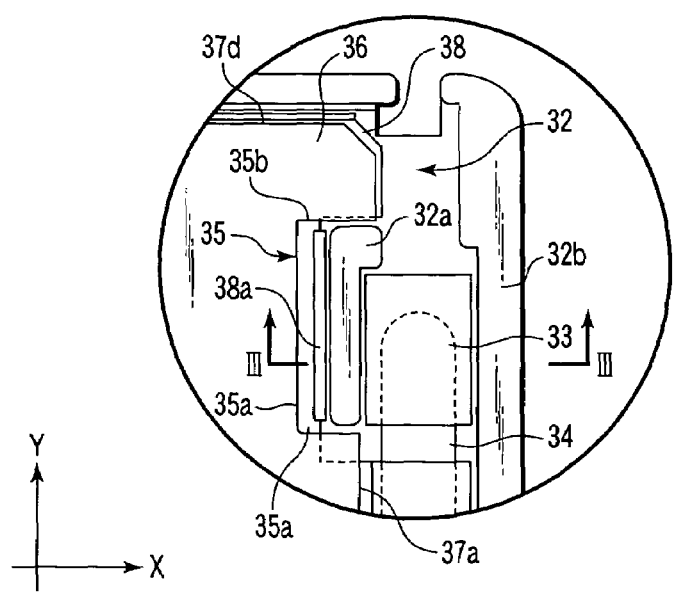
FIG. 2B is an enlarged view of a projection of the planar light source shown in FIG. 2A.

FIG. 2(a) is a front view of the backlight 30, and FIG. 2(b) is an enlarged view of the projection 32 provided at a right upper portion of the backlight 30 and the vicinity of the projection 32. It should be noted that these figures show the backlight 30, with the optical sheet 39 and front frame 31 removed therefrom, which are shown in FIG. 3, in order for the backlight 30 to be more easily understood.

Referring to FIGS. 2A and 2B, for example, the cold cathode fluorescent tube 34 is provided along the frame section 32b on the right and bottom of the back frame 32. The cold cathode fluorescent tube 34 is a long, narrow, cylindrical light source. A lamp holder 33, which is formed of, e.g., rubber having elasticity, is attached to either end of the cold cathode fluorescent tube 34.

The light guide 36 has a first main surface (front side) 36a and a second main surface (back side) 36b, which are opposed to each other, and four side surfaces 37 (37a to 37d) extending between the first and second main surfaces 36a and 36b. The side surfaces 37a and 37b are opposed to the cold cathode fluorescent tube 34, and the first main surface 36a is opposed to the back of the liquid crystal display panel 10. In other words, the side surfaces 37a and 37b correspond to a light incidence surface that receives light from the cold cathode fluorescent tube 34, while the first main surface 36a corresponds to a light emitting surface that emits light to the liquid crystal display panel 10.

A projection 32a is formed at the back frame 32 and between one end of the cold cathode fluorescent tube 34 and the side surface 37a of the light guide section 36. Another projection 32a is formed at the back frame 32 and between the other end thereof and the side surface 37b thereof. These projections 32a are used to position the cold cathode fluorescent tube 34 and the light guide 36. Notches 35 are formed in their respective side surfaces 37a and 37b, and the projections 32a are fitted into their respective notches 35. Each of the notches 35 has a first side surface 35a extending substantially parallel to its corresponding one of the side surfaces 37a and 37b and two second side surfaces 35b extending substantially perpendicularly to the first side surface 35a.

The optical sheet 38 arranged on the back side 36b of the light guide 36 provides a given optical property for light leaking from the back side 36b. In other words, the optical sheet 38 is a reflecting sheet that reflects light leaking from the back side 36b and the side surfaces 37 toward the light guide 36. On the other hand, the optical sheet 39 arranged on the front side 36a of the light guide 36 provides a given optical property for light radiated from the front side 36a. The optical sheet 39 is a light-collecting sheet, a light-diffusing sheet or the like.

The optical sheet 38 has tongues 38a as regulation sections. Each of the tongues 38a extends from the optical sheet 38 and is folded along the first side surface 35a of the notch 35. It is thus arranged between the notch 35 and the projection 32a.

As illustrated in FIG. 4, the optical sheet 38 is substantially rectangular and its upper right-hand and lower left-hand corners are cut substantially rectangularly. The tongue 38a is also substantially rectangular and positioned in agreement with each of the projections 32a in the upper right-hand and lower left-hand corners of the optical sheet 38.

The light guide 36 is located within a range that is defined by the dotted lines along the upper and left sides of the optical sheet 38 and the innermost ones of the dotted lines along the lower and right sides thereof. The cold cathode fluorescent tube 34 is located between the light guide 36 and the middle ones of the dotted lines along the lower and right sides of the optical sheet 38.

The tongues 38a of the optical sheet 38 are folded along their respective side surfaces 37c and 37d of the light guide 36 and each located between the light guide 36 and the projection 32a. The portions of the optical sheet 38, which are outside the dotted lines along the upper and left sides, are folded along these dotted lines to cover the side surfaces 37c and 37d of the light guide 36, neither of which is opposed to the cold cathode fluorescent tube 34. The portions of the optical sheet 38, which are outside the middle ones of the dotted lines along the lower and right sides, are folded twice to cover the side and top surfaces of the cold cathode fluorescent tube 34, neither of which is opposed to the light guide 36.

It is desirable that the height of the tongue 38a, which is folded along the first side surface 35a of the notch 35 of the light guide 36, be at least not less than half the height of the light guide 36. It is also desirable that the width of the tongue 38a be not less than half the width of the projection.

The widths of the tongue 38a, projection 32a and notch 35 correspond to the lengths thereof in the direction (Y direction) that is almost perpendicular to line III-III of FIG. 2B.

The heights of the folded tongue 38a and the light guide 36 correspond to the lengths thereof in the Z direction shown in FIG. 3.

If, as described above, the tongue 38a is formed at the optical sheet 38 as a regulation section and arranged between the light guide 36 and the projection 32a of the back frame 32, the light guide 36 and the projection 32a do not come into direct contact with each other. Even though both the projection 32a and the light guide 36 are made of firm materials, noise due to contact between the light guide 36 and the projection 32a can be suppressed without adding any new components.

Even though light that radiates from the cold cathode fluorescent tube 34 leaks from the second main surface 36b of the light guide 36 and the side surface thereof which does not face the cold cathode fluorescent tube 34, the optical sheet 38 can reflect the leakage light in the direction of the light guide 36.

In the above embodiment, the tongue 38a of the optical sheet 38 formed on the second main surface 36b of the light guide 36 is folded from below the light guide 36 and positioned between the light guide 36 and the projection 32a. However, the tongue can be formed on the optical sheet 39 formed on the first main surface 36a of the light guide 36, folded along the side surface 37 from the first main surface 36a, and positioned between the light guide 36 and the projection 32a.

In the above embodiment, the substantially L-shaped cold cathode fluorescent tube 34 is used as a light source. However, a substantially linear cold cathode fluorescent tube can be used. In this case, it is desirable to form the light guide 36 as not a substantially rectangular plate but a wedge that gradually decreases in thickness from one side that receives light from the cold cathode fluorescent tube to the other side. Such a configuration can produce the same advantages as those of the above embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A planar light source device comprising:
   a light source;
   a light guide opposed to the light source to guide light which is received from the light source;
   a frame which supports the light source and the light guide, and has a projection which positions the light source and the light guide; and
   an optical sheet which provides an optical property for light radiated from the light source, and has a regulation section that regulates contact between the light guide and the projection of the frame, the regulation section being located between the light guide and the projection,
   wherein the light guide has a first main surface from which light is to be emitted, a second main surface that is a back side of the first main surface and is opposed to the frame, and a side surface that extends between the first main surface and the second main surface and is opposed to the projection, and
   the optical sheet is opposed to one of the first main surface and the second main surface, and the regulation section has a tongue that extends from the optical sheet and is folded along the side surface of the light guide.

2. The planar light source device according to claim 1, wherein the light guide has a light incidence surface that receives light from the light source, and the first main surface from which light received from the light incidence surface is to be emitted, and
   the optical sheet is arranged on the first main surface of the light guide, and the tongue is provided at the optical sheet.

3. The planar light source device according to claim 1, wherein the light guide has a light incidence surface that receives light from the light source, and the first main surface from which light received from the light incidence surface is to be emitted, and
   the optical sheet is arranged between the frame and the second main surface of the light guide, and the tongue is provided at the optical sheet.

4. A planar light source device comprising:
   a light source;
   a light guide opposed to the light source to guide light which is received from the light source;
   a frame which supports the light source and the light guide, and has a projection which positions the light source and the light guide; and
   an optical sheet which provides an optical property for light radiated from the light source, and has a regulation section that regulates contact between the light guide and the projection of the frame, the regulation section being located between the light guide and the projection,
   wherein the optical sheet is substantially rectangular and larger than a section in which the light guide and the light source are arranged, and
   the optical sheet is arranged to cover a side surface of the light guide which is not opposed to the light source, a side surface or a top surface of the light source which is not opposed to the light guide.

5. A liquid crystal display device including a liquid crystal display panel having an effective display section in which a plurality of display pixels are arranged and a planar light source device which illuminates the liquid crystal display panel,
   the planar light source device comprising:
   a light source;
   a light guide opposed to the light source to guide light which is received from the light source;
   a frame which supports the light source and the light guide and has a projection which positions the light source and the light guide; and
   an optical sheet which provides an optical property for light radiated from the light source and has a regulation section that regulates contact between the light guide and the projection of the frame, the regulation section being located between the light guide and the projection,
   wherein the light guide has a first main surface that is opposed to the liquid crystal display panel, a second main surface that is opposed to the frame, and a side surface that extends between the first main surface and the second main surface and is opposed to the projection, and
   the optical sheet is opposed to one of the first main surface and the second main surface, and the regulation section has a tongue that extends from the optical sheet and is folded along the side surface of the light guide.

6. The liquid crystal display device according to claim 5, wherein the light guide has a light incidence surface that receives light from the light source, and the first and second main surfaces of the light guide are opposed to each other from which light received from the light incidence surface is to be emitted, and the optical sheet is arranged on the first main surface of the light guide, and the tongue is provided at the optical sheet.

7. The liquid crystal display device according to claim 5, wherein the light guide has a light incidence surface that receives light from the light source, and the first and second main surfaces of the light guide are opposed to each other from which light received from the light incidence surface is to be emitted, and the optical sheet is arranged between the frame and the second main surface of the light guide, and the tongue is provided at the optical sheet.

8. The liquid crystal display device according to claim 5, wherein the optical sheet is each substantially rectangular and larger than a section in which the light guide and the light source are arranged, and the optical sheet is arranged to cover a side surface of the light guide which is not opposed to the light source, and a side surface or a top surface of the light source which is not opposed to the light guide.

* * * * *